(12) United States Patent
Uzawa et al.

(10) Patent No.: US 6,882,519 B2
(45) Date of Patent: Apr. 19, 2005

(54) FLAT ALUMINUM ELECTROLYTIC CAPACITOR AND METHOD OF MANUFACTURING THE SAME

(75) Inventors: Shigeru Uzawa, Ina (JP); Yoshiki Makino, Ina (JP); Katsuhisa Kamakura, Ina (JP); Yuuichi Kobayashi, Ina (JP); Akihiko Komatsu, Ina (JP); Taketo Matsuzawa, Ina (JP)

(73) Assignee: Rubycon Corporation, Nagano-ken (JP)

( * ) Notice: Subject to any disclaimer, the term of this patent is extended or adjusted under 35 U.S.C. 154(b) by 0 days.

(21) Appl. No.: 10/665,759

(22) Filed: Sep. 19, 2003

(65) Prior Publication Data

US 2004/0246655 A1 Dec. 9, 2004

(30) Foreign Application Priority Data

Mar. 31, 2003 (JP) ........................................ 2003-096217

(51) Int. Cl.⁷ ................................................. H01G 9/00
(52) U.S. Cl. ........................ 361/523; 361/516; 361/519; 361/520; 361/525; 361/528; 361/529; 29/25.03
(58) Field of Search ................................. 361/509, 512, 361/516, 519, 520, 523, 525, 528, 529, 508, 502, 504, 433; 29/25.03; 252/62.2

(56) References Cited

U.S. PATENT DOCUMENTS 4,267,565 A * 5/1981 Puppolo et al. ............. 361/530
4,580,194 A * 4/1986 Finkelstein et al. ......... 361/507
4,603,467 A * 8/1986 Kaneko ..................... 29/25.03

FOREIGN PATENT DOCUMENTS

| JP | 55-143024 | 11/1980 |
|---|---|---|
| JP | 57-1219 | 1/1982 |
| JP | 58-178517 | 10/1983 |
| JP | 60-213016 | 10/1985 |
| JP | 4-223317 | 8/1991 |

* cited by examiner

Primary Examiner—Dean A. Reichard
Assistant Examiner—NGuyen T. Ha
(74) Attorney, Agent, or Firm—Merchant & Gould P.C.

(57) ABSTRACT

The present invention relates to a method of manufacturing a flat aluminum electrolytic capacitor comprising a separator impregnated with an electrolytic solution, an anode foil and a cathode foil, a flat capacitor element that has external lead-out terminals connected respectively to the anode foil and the cathode foil, and a flexible casing that houses the capacitor element and is hermetically sealed, said method comprising the steps of encasing the capacitor element in the flexible casing and applying aging treatment before hermetically sealing the casing, and hermetically sealing the flexible casing, and also relates to a flat aluminum electrolytic capacitor comprising a separator impregnated with the electrolytic solution, the anode foil and the cathode foil, the flat capacitor element that has the external lead-out terminals connected respectively to the anode foil and the cathode foil, and the flexible casing that houses the capacitor element and is hermetically sealed, wherein the electrolytic capacitor is subjected to an aging treatment before the capacitor element is encased in the flexible casing which is hermetically sealed.

16 Claims, 3 Drawing Sheets

FLAT ALUMINUM ELECTROLYTIC CAPACITOR AND METHOD OF MANUFACTURING THE SAME

BACKGROUND OF THE INVENTION

1. Field of the Invention

The present invention relates to a flat aluminum electrolytic capacitor and a method of manufacturing the same. More particularly, the present invention relates to a flat aluminum electrolytic capacitor, comprising a capacitor element having a stacked structure or a capacitor element having wound structure, that is encased in a hermetically sealed flexible casing, and a method of manufacturing the same.

2. Description of the Related Art

Electrolytic capacitors have conventionally been manufactured by encasing a capacitor element, comprising two electrode foils (an anode foil and a cathode foil) and a separator interposed therebetween which are wound in a roll, in a cylindrical metal casing, and stopping the openings of the metal casing with a terminal board having lead terminals.

As electronic apparatuses and optical apparatuses such as cameras have become smaller in profile and in thickness, the conventional aluminum electrolytic capacitor of cylindrical configuration is viewed as too large and it takes too much space on a circuit board compared to other electronic components. Although capacitors may be made flat instead of the cylindrical construction, there is a dimensional limitation in manufacturing the flat capacitor thus generating an obstacle to making apparatuses smaller in profile and in thickness. Accordingly, there are demands for capacitors having configurations different from those of the prior art, in order to fit in the component mounting space of the smaller electronic apparatuses. To meet these demands, an electrolytic capacitor having a hermetically sealed structure of composite films has been proposed as disclosed in Japanese Unexamined Patent Publication (Kokai) No. 55-143024 (Patent Document 1) and Japanese Unexamined Patent Publication (Kokai) No. 58-178517 (Patent Document 2). Since the electrolytic capacitor having such a hermetically sealed structure of composite films can be made to have an external configuration in accordance to the shape of the capacitor element, an electrolytic capacitor of a desired shape, besides the conventional cylindrical shape, such as rectangular, sheet and oval configurations can be manufactured, thus greatly contributing to a decrease in the profile and thickness of the electronic apparatuses.

The electrolytic capacitor disclosed in Japanese Unexamined Patent Publication (Kokai) No. 55-143024 (Patent Document 1) is manufactured by covering a capacitor element with a metal-resin composite laminate film and hermetically sealing the capacitor element by thermo compression bonding of the composite laminate film at the periphery.

The electrolytic capacitor disclosed in Japanese Unexamined Patent Publication (Kokai) No. 58-178517 (Patent Document 2) is manufactured by covering a capacitor element with a metal film and a composite film comprising a metal film laminated with plastic film on both sides thereof, and hermetically sealing the capacitor element by thermo compression bonding of the composite laminate film.

The aluminum electrolytic capacitor of the prior art comprises the capacitor element that is manufactured by disposing an anode foil and a cathode foil, opposing each other via a sheet of separator paper interposed therebetween. The capacitor element is then impregnated with an electrolytic solution and is encased in a metal casing. The casing is then stopped and sealed at the openings thereof. To stabilize the performance of the capacitor of such a structure, an appropriate level of voltage is applied across the capacitor in a relatively high temperature atmosphere, so as to carry out a anodization, or the so-called aging treatment. In the aging treatment, damage caused, during the capacitor forming process, to an aluminum oxide film formed on the anode foil and the cathode foil are remedied.

While hydrogen gas is generated through a reaction between the electrolytic solution and the foil electrodes during the aging treatment, the capacitor element of the prior art is encased in a metal casing having enough strength to resist the pressure of hydrogen gas generated during the aging treatment so as to maintain the external configuration thereof because the opening of the casing is sealed by calking with a strong force. An attempt has also been made where the casing is sealed by means of sealant made of rubber through which hydrogen gas is discharged to the outside (Japanese Unexamined Patent Publication (Kokai) No. 57-1219: Patent Document 3). With this construction, however, what can be discharged through diffusion via the rubber sealant is the small amount of hydrogen gas generated during use of the capacitor after it has been manufactured, at most. Hydrogen gas generated rapidly during the aging treatment cannot be discharged with this construction. Even during normal operation, the gas pressure rises so as to cause deformation of the capacitor and/or degradation of performance at times when hydrogen gas is generated at a high rate which cannot be accommodated by the rubber sealant.

As a result, it has been common to use a metal casing that is strong but is not easy to process into a desired shape, in order to ensure performance and strength.

In the meantime, in order to allow the use of the capacitors in wider range of products, methods such as as forming the capacitor in a desired shape have been studied so as to meet the conditions of the product where it is to be used with emphasis placed on the flexible processing capability, and using a flexible material or a thin sheet of less strength in forming the casing for the purpose of reducing the capacitor size. However, as such a casing has insufficient strength, troubles such as swelling or rupture of the capacitor, deformation of the capacitor element and degradation of the characteristics of the capacitor, occur when the inside pressure of the casing rises as hydrogen gas is generated during the aging treatment. Also, during normal use, hydrogen gas is generated and accumulates through the reaction between the aluminum foil electrodes and the electrolytic solution, the inside pressure of the casing rises and causes the capacitor to swell.

In the case of aluminum electrolytic capacitor of flat configuration or stacked structure, the foil electrode is more liable to stress and damage the dielectric film compared to the conventional aluminum electrolytic capacitor of cylindrical shape. As a consequence, there have been such problems as a significant amount of hydrogen gas is generated during the aging treatment, thereby causing the casing to swell, deform or rupture, the electrolytic solution to leak, the capacitor element to be deformed by the hydrogen gas, and the characteristics of the capacitor to deteriorate. Also during normal use, hydrogen gas is generated and accumulates through the reaction between the aluminum foil electrodes and the electrolytic solution, and therefore the inside pressure of the casing rises causing the capacitor to swell.

The present invention has been devised in order to overcome the drawbacks of the prior art technology described above and make full use of the space, in the final product, available for the capacitor. For this purpose, the present invention provides a method of manufacturing a flat aluminum electrolytic capacitor, wherein a flat capacitor employing a flat or stacked capacitor element that is encased in a casing made of such a material which can be formed into a desired and compact shape (for example, a flexible and strong film or a laminated sheet) or a flexible casing that accommodates the shape of the capacitor element with the casing being sealed, while hydrogen gas generated during the manufacturing process is discharged to the outside so that the capacitor remains compact without swelling. The present invention also provides a flat aluminum electrolytic capacitor having a small size where hydrogen gas generated during the manufacturing process is dispersed to the outside and capable of absorbing hydrogen gas generated during use so as to maintain the shape without deformation, that is manufactured by the method described above.

SUMMARY OF THE INVENTION

The first aspect of the present invention is a method of manufacturing a flat aluminum electrolytic capacitor comprising a separator impregnated with an electrolytic solution, an anode foil and a cathode foil, a flat capacitor element having external lead-out terminals that are connected respectively to the anode foil and the cathode foil, and a flexible casing that encases the capacitor element and is hermetically sealed, said method comprising the steps of encasing the capacitor element in the flexible casing and applying an aging treatment before sealing the casing, and hermetically sealing the flexible casing.

The second aspect of the present invention is a method of manufacturing a flat aluminum electrolytic capacitor comprising a separator impregnated with an electrolytic solution, an anode foil and a cathode foil, a flat capacitor element having external lead-out terminals that are connected respectively to the anode foil and the cathode foil and a flexible casing that houses the capacitor element and is hermetically sealed, said method comprising the steps of encasing the capacitor element in a predetermined casing and applying an aging treatment under a condition that the casing is sealed, purging a gas that has been generated within, and hermetically sealing the flexible casing that houses the capacitor.

The third aspect of the present invention is a method of manufacturing a flat aluminum electrolytic capacitor comprising a separator impregnated with an electrolytic solution, an anode foil and a cathode foil, a flat capacitor element having external lead-out terminals that are connected respectively to the anode foil and the cathode foil, and a flexible casing that houses the capacitor element and is hermetically sealed, said method comprising the steps of carrying out an aging treatment while impregnating the separator with the electrolytic solution, and hermetically sealing the flexible casing.

The fourth aspect of the present invention is the method of manufacturing a flat aluminum electrolytic capacitor according to any one of the first to third aspects of the invention, further comprising the step of carrying out an aging treatment again after the step of hermetically sealing the flexible casing.

The fifth aspect of the present invention is the method of manufacturing a flat aluminum electrolytic capacitor according to any one of the first to third aspects of the invention, comprising the step of carrying out impregnation with the electrolytic solution before encasing the capacitor element in the flexible casing, or carrying out impregnation with the electrolytic solution in the flexible casing after encasing the capacitor element in the flexible casing.

The sixth aspect of the present invention is the method of manufacturing a flat aluminum electrolytic capacitor according to any one of the first to third aspects of the invention, further comprising the step of once again impregnating the capacitor element, that has been subjected to the aging treatment, with the electrolytic solution.

The seventh aspect of the present invention is the method of manufacturing a flat aluminum electrolytic capacitor according to the sixth aspect of the invention, wherein electrolytic solutions of different compositions are used in the first and the second impregnation steps.

The eighth aspect of the present invention is the method of manufacturing a flat aluminum electrolytic capacitor according to any one of the first to third aspects of the invention, wherein the flexible casing is sealed under the condition of reduced pressure of below 1 atm. in order to reduce voids in the casing, after encasing the capacitor element in the flexible casing.

The ninth aspect of the present invention is the method of manufacturing a flat aluminum electrolytic capacitor according to any one of the first to third aspects of the invention, wherein the aging treatment is carried out at least once at an ambient temperature in a range from 10 to 125° C.

The tenth aspect of the present invention is the method of manufacturing a flat aluminum electrolytic capacitor according to any one of the first to third aspects of the invention, wherein the aging treatment is carried out under reduced pressure.

The eleventh aspect of the present invention is the method of manufacturing a flat aluminum electrolytic capacitor according to any one of the first to third aspects of the invention, wherein the aging treatment is carried out while applying a voltage stepwise.

The twelfth aspect of the present invention is the method of manufacturing a flat aluminum electrolytic capacitor according to any one of the first to third aspects of the invention, wherein the aging treatment is carried out at a constant voltage.

The thirteenth aspect of the present invention is the method of manufacturing a flat aluminum electrolytic capacitor according to any one of the first to third aspects of the invention, wherein the flat capacitor element has a stacked structure formed by laminating the anode foil and the cathode foil, of predetermined sizes, alternately via separators, or winding a laminate of long anode and cathode foils laminated one on another with the resultant roll being flattened.

The fourteenth aspect of the present invention is the method of manufacturing a flat aluminum electrolytic capacitor according to any one of the first to third aspects of the invention, further comprising the step of carrying out the aging treatment after encasing the capacitor element, that has been encased in the flexible casing which is then hermetically sealed, in an outer casing having a higher strength.

The fifteenth aspect of the present invention is a flat aluminum electrolytic capacitor comprising a separator impregnated with an electrolytic solution, an anode foil and a cathode foil, a flat capacitor element that has external lead-out terminals connected respectively to the anode foil and the cathode foil, and a flexible casing that houses the capacitor element and is hermetically sealed, wherein the electrolytic capacitor is subjected to an aging treatment before the capacitor element is encased in the flexible casing which is then hermetically sealed.

The sixteenth aspect of the present invention is a flat aluminum electrolytic capacitor comprising a separator impregnated with an electrolytic solution, an anode foil and a cathode foil, a flat capacitor element that has external lead-out terminals connected respectively to the anode foil and the cathode foil, and a flexible casing that houses the capacitor element and is hermetically sealed, wherein the electrolytic capacitor is encased in a predetermined casing, subjected to an aging treatment in sealed condition, with a gas generated during the treatment being discharged to the outside, then the flexible casing is hermetically sealed.

The seventeenth aspect of the present invention is a flat aluminum electrolytic capacitor comprising a separator impregnated with an electrolytic solution, an anode foil and a cathode foil, a flat capacitor element that has external lead-out terminals connected respectively to the anode foil and the cathode foil, and a flexible casing that houses the capacitor element and is hermetically sealed, wherein the electrolytic capacitor is subjected to an aging treatment while being impregnated with the electrolytic solution, and then the flexible casing is hermetically sealed.

The eighteenth aspect of the present invention is the flat aluminum electrolytic capacitor according to any one of the fifteenth to seventeenth aspects of the invention, wherein the electrolytic solution of the flat aluminum electrolytic capacitor contains at least one kind of nitro compound.

The nineteenth aspect of the present invention is the flat aluminum electrolytic capacitor according to any one of the fifteenth to seventeenth aspects of the invention, wherein the flat aluminum electrolytic capacitor is an aluminum electrolytic capacitor for use at a mid- to high-voltage of 100 V or higher, or an aluminum electrolytic capacitor for a strobe flash.

DETAILED DESCRIPTION OF THE INVENTION

Figure 1:
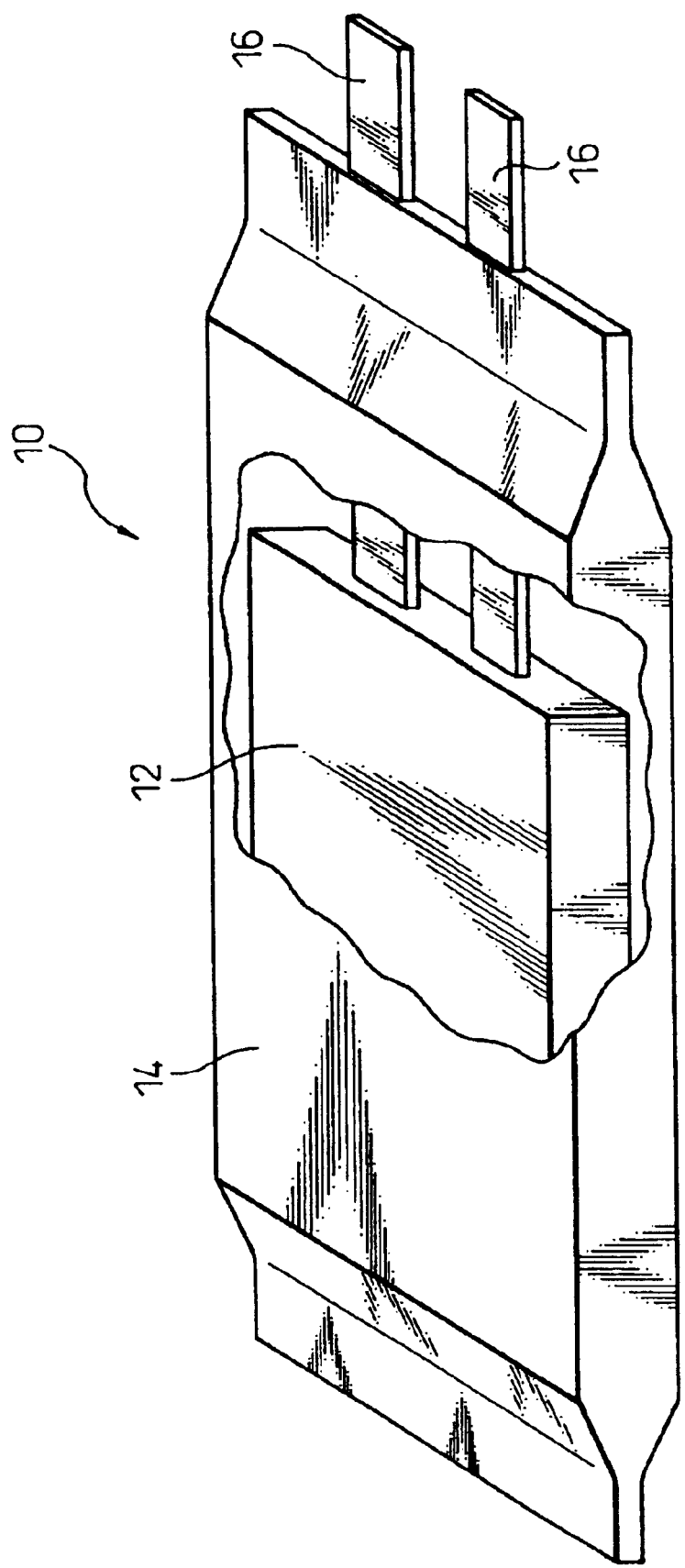
FIG. 1 is a perspective view explaining a capacitor element used in the Examples.

The present invention, with features as described above, has the effects of preventing the flexible casing from being broken by a rising inner pressure during an aging treatment of the flat capacitor element, and suppressing the leakage of liquid to the outside.

The present invention will be described in detail, below, with reference to specific aspects thereof, which should be understood to be mere examples given for ease in understanding the present invention and are not intended to limit the scope of the present invention. It should be noted that various forms and modifications of the present invention can be envisioned within the scope of the present invention, which is defined by the appended claims.

The aging treatment according to the present invention is carried out at least once at an ambient temperature in a range from 10 to 125° C. before hermetically sealing the flexible casing, but it is also effective to carry out the aging treatment while incrementing the voltage stepwise instead of the conventional process of applying a constant voltage. Moreover, efficiency of the aging treatment and stability of the characteristics of the capacitor can be greatly improved by carrying out the aging treatment under a reduced pressure or impregnating the capacitor element with the electrolytic solution again after the aging treatment so as to replenish the electrolytic solution that has been consumed in the aging treatment, or using electrolytic solutions of different compositions in the first impregnation treatment and in the second impregnation treatment conducted after the aging treatment, so that each of the electrolytic solutions has the composition most effective in aging, and the maximum effect in maintaining the characteristics of the capacitor, for example by having a nitro compound that is capable of absorbing hydrogen contained in the electrolytic solution.

The present invention can be applied to various aluminum electrolytic capacitors. A preferable aluminum electrolytic capacitor to which the present invention may be applied includes, but is not limited to, an aluminum electrolytic capacitor for used at a low voltage below 100 V, an aluminum electrolytic capacitor for use at mid-to high-voltage of 100 V or higher, and an aluminum electrolytic capacitor for strobe flash.

Method of Aging Treatment

The aging treatment may be carried out either when the capacitor element impregnated with the electrolytic solution has been encased in the flexible casing but the casing is not yet hermetically sealed, or after the casing has been hermetically sealed. Specifically, the aging treatment is carried out by applying a voltage between the external lead-out terminals connected to the anode and the cathode of the capacitor element to supply current for a predetermined period of time, and is concluded when the generation of hydrogen gas has settled as the damages of aluminum oxide on the surface of the aluminum electrode are remedied (an aluminum oxide film is formed) and a leak current has sufficiently dwindled indicating the completion of the aluminum oxide film. While conditions of the aging treatment such as the applied voltage and duration of current supply vary slightly depending on the capacitance of the electrolytic capacitor and other factors, they can be easily determined with reference to the settling of the hydrogen gas generation and the leak current. Specific conditions will be explained in the following Examples.

The aging treatment can be carried out when the separator element impregnated with the electrolytic solution is encased in the flexible casing but the casing is not yet hermetically sealed. Hydrogen gas generated during the aging treatment can be fully discharged by carrying out the aging treatment before hermetically sealing the flexible casing.

Also, if the aging treatment is carried out when the capacitor element is encased in the flexible casing but the casing is not yet hermetically sealed, then the flexible casing is hermetically sealed and aging treatment is carried out again, as hydrogen gas is fully discharged by the aging treatment conducted before sealing, troubles such as swelling of the flexible casing and leakage of the solution do not occur despite the aging treatment being conducted after sealing.

Gas generated in a predetermined casing can also be discharged after encasing the capacitor element in the predetermined casing and applying the aging treatment to the sealed capacitor element. The predetermined casing may be a flexible casing or a casing made of a material that is capable of sealing (a metal casing, for example). Purging of gas may also be carried out by providing an opening in the casing. The opening may be made by unsealing the sealed portion, drilling a hole in other portion, cutting off the casing or other means. Sealing the casing temporarily has an advantage of making the electrolytic solution that impregnates the capacitor element less likely to scatter, when applying the aging treatment at a high ambient temperature from 85 to 105° C. Hydrogen gas generated during the aging treatment after temporarily sealing the casing can be fully discharged by forming an opening in the casing and purging the gas through the opening under normal or reduced pressure.

The sealing operation may be carried out either under normal or reduced pressure, and by either thermal fusing or ultrasonic welding.

After the gas purging process, the capacitor element may be encased in a flexible casing which is then sealed, and aging treatment may be applied again. Also in this case, as hydrogen gas is purged by such means as forming an opening in the casing after the aging treatment, troubles such as swelling of the flexible casing and leakage of the solution do not occur despite the aging treatment being conducted after sealing.

Aging treatment may also be carried out while impregnating the capacitor element with the electrolytic solution. In this case, too, as hydrogen gas generated during the aging treatment can be purged before sealing the flexible casing, troubles such as swelling of the flexible casing and leakage of the solution do not occur. In addition, the aging treatment can be carried out while impregnating the capacitor element with electrolytic solution.

The capacitor element encased in the flexible casing may have been impregnated with the electrolytic solution or, alternatively, a dry capacitor element that has not been impregnated may be then impregnated with the electrolytic solution after being encased.

Aging treatment can be carried out at any temperatures in a range from 10 to 125° C. When the aging treatment is carried out at a low temperature, a rapid reaction due to heat does not occur and therefore generation of hydrogen gas can be suppressed. When the aging treatment is carried out at a high temperature, on the other hand, hydrogen gas is discharged in a short period of time, and therefore efficiency of the aging treatment is improved by completing the reaction in a shorter period of time. To make use of these advantages, the aging treatment is more preferably carried out at a temperature in a range from 30 to 100° C. Furthermore, the efficiency of the aging treatment can be improved by carrying out the aging treatment while impregnating the capacitor element with the electrolytic solution with the temperature of the capacitor element being controlled in a range from 15 to 125° C.

It is also effective to carry out the aging treatment in multiple stages at different ambient temperatures. In this case, steps of the aging treatment are preferably grouped into a low temperature phase and a high temperature phase. Specifically, it is most preferable to carry out the aging treatment first at temperatures in a range from 10 to 35° C., then at temperatures in a range from 60 to 105° C. The aging treatment may be repeated any number of times as required.

Aging treatment may also be carried out under reduced pressure. This procedure of aging treatment makes it possible to remove the hydrogen gas generated during the aging treatment, and improves the characteristics of the flat aluminum electrolytic capacitor after the aging treatment.

Aging treatment may also be carried out while applying a constant voltage. This procedure of aging treatment makes it possible to control the aging treatment relatively easily and, as the amount of hydrogen gas generated can be controlled, the characteristics of the capacitor can be improved.

Furthermore, the aging treatment may also be carried out while increasing the voltage either stepwise or continuously, so as to reduce the load on the oxide film, improve the effect of aging and improve the characteristics of the capacitor.

It is also possible to carry out the aging treatment on the capacitor element that has been impregnated with the electrolytic solution, and then impregnate the capacitor element with the electrolytic solution again. Characteristics of the flat aluminum electrolytic capacitor can be improved by impregnating it with the electrolytic solution twice. It also prolongs the service life of the flat aluminum electrolytic capacitor.

If the capacitor element is impregnated with electrolytic solution twice, the electrolytic solution used in the second impregnation treatment may have different composition from that used in the first impregnation treatment conducted before the aging treatment. By using the electrolytic solutions of different compositions in the first impregnation treatment and in the second impregnation treatment, it is made possible to improve the efficiency of the aging treatment, absorb hydrogen gas and improve the characteristic of the flat aluminum electrolytic capacitor after the aging treatment.

An electrolytic solution containing at least one kind of a nitro compound may also be used. While there is no limitation to the nitro compound, it is preferable to use a nitro compound that is soluble in the solvent of the electrolytic solution and has high heat resistance. For example, phenyl compounds having a nitro group represented by nitrobenzoic acid, nitrophenol, nitroacetophenons, nitroanisole and salts or derivatives thereof, saturated or unsaturated aliphatic nitro compounds such as nitro acetate and nitroisobutane, and nitroso compounds produced by reduction of compounds having a nitro group are effective in absorbing hydrogen. As including the nitro compound enables the electrolytic solution to absorb hydrogen, combined use thereof with aging treatment makes it possible to improve the characteristics of the capacitor after the aging treatment, absorb hydrogen gas and prevent swelling of the casing when the capacitor is put into use. When the capacitor is used, as hydrogen gas generated through reaction between the aluminum foil electrode and the electrolytic solution can be absorbed, the capacitor can be kept from swelling due to the rising pressure inside of the casing so as to minimize the deformation of the casing, and maintain the performance over the service life thereof. The corrosion resistance of the capacitor can also be improved.

The nitro compound may also be applied to the flexible casing in the form of coating, instead of being contained in the electrolytic solution. The nitro compound applied to the flexible casing has a similar effect to that of nitro compound contained in the electrolytic solution. Characteristics of the capacitor can be improved further by using a nitro compound applied to the flexible casing and a nitro compound contained in the electrolytic solution in combination.

Flexible Casing

The flat aluminum electrolytic capacitor of the present invention comprising a flexible casing, a flat aluminum electrolytic capacitor element housed in the flexible casing which is hermetically sealed, and external lead-out terminals led respectively from the anode foil and the cathode foil of the capacitor element.

The flexible casing may be made of any material that can enclose the capacitor element in hermetically sealed condition. The material is required merely to have strength and flexibility, and may comprise a soft material only or a composite material consisting of a soft material and a hard material (either laminated, or a soft material sheet reinforced on a part of which with a hard material sheet in an integral structure). The casing may also be made of only a hard material as long as it provides strength and flexibility (for example, a thin sheet that retains sufficient strength).

The flexible casing may also be made of a metallic material. In this case, the metal casing that houses the capacitor element can be hermetically sealed by means such as laser welding, resistor welding or pressure welding. A separator that surrounds the capacitor element isolates the capacitor element from the metal casing, while the external lead-out terminals connected to the electrodes of the capacitor element are isolated from the metal casing by an insulator at a portion where they are led to the outside. The metallic material is preferably aluminum or an aluminum alloy, but other metals may also be used. The thickness of the metallic material is from 5 to 300 $\mu$m, preferably from 5 to 200 $\mu$m, and most preferably from 10 to 100 $\mu$m.

The flexible casing may also be made of a resin. The resin may be either a thermoplastic resin or a thermosetting resin. When the thermosetting resin is used, it can be used with a thermoplastic sheet adhered thereon so that the casing that houses the capacitor element can be hermetically sealed by thermal fusing. Besides thermal fusing, the casing that houses the capacitor element may also be sealed by bonding with an adhesive, ultrasonic welding, hermetic seal, laser welding or pressure welding.

For the resin, for example, nylon, PP, PET, PBT, PPS, liquid crystal polymer, engineering plastics, polystyrene, polyethylene, fluororesin, or polyamide may be used. These resins may also be used in combination with a glass filler so as to improve heat resistance. The resin material is not limited to these materials, and other kinds of resin may also be used.

The flat aluminum electrolytic capacitor of the present invention preferably employs a flexible casing so as to make it easier to hermetically seal while enclosing the capacitor element therein. Particularly suitable is a composite material consisting of a metal layer and a resin layer laminated with each other. This composite material has basic structure of a laminate consisting of a metal sheet sandwiched by resin layers. The casing made of the composite material may be sealed by thermal fusing, bonding with an adhesive, ultrasonic welding, hermetic seal, laser welding or pressure welding.

For the metal, aluminum, copper, nickel, titanium or alloy thereof may be preferably used. Most preferably, aluminum or an aluminum alloy is used for the advantages of the availability and cost. The thickness of the metal sheet is preferably from 5 to 300 $\mu$m, and most preferably from 5 to 200 $\mu$m.

A thick metal layer makes it difficult to process the composite material and hermetically seal the casing made therefrom. When the metal layer is too thin, insufficient strength may lead to unsatisfactory sealing that may result in leakage.

For the resin, nylon, polyethylene terephthalate (PET), polybutylene terephthalate (PBT), polyphenylene sulfide (PPS) and polyimide may be preferably used. Among these, nylon or PET is most preferably used for the advantages of availability and cost. The thickness of the resin layer is preferably from 5 to 100 $\mu$m, and most preferably from 5 to 50 $\mu$m. Thick resin layer makes it difficult to process the composite material and hermetically seal the casing made therefrom. When the resin layer is too thin, unsatisfactory sealing and consequently leakage may result.

A bonding layer resin may be provided on the side of the composite material that makes contact with the capacitor element (the side that comes inside of the flexible casing). The bonding layer may be provided either on the resin layer on the side of the composite material that makes contact with the capacitor element in the basic structure of resin layer—metal layer—resin layer of the composite material, or on the resin layer on the side that makes contact with the capacitor element.

The bonding layer resin consists of a resin that is effective in hermetically sealing the casing that encases the capacitor element. The bonding layer resin may be polypropylene (PP), polyethylene (PE), an acid-denatured product thereof, or ionomer. The thickness of the bonding layer resin is preferably from 10 to 200 $\mu$m, and most preferably from 20 to 100 $\mu$m.

The thickness of the composite material is preferably from 20 to 600 $\mu$m, and most preferably from 30 to 500 $\mu$m. Thick resin layer makes it difficult to process the composite material and seal the casing made therefrom. When the thickness is too small, unsatisfactory hermetic sealing and consequently leakage may result.

Conditions for Hermetically Sealing the Flexible Casing

Hermetic sealing of the flexible casing, with the capacitor element that has been subjected to an aging treatment being put therein, may be carried out under normal pressure.

In the prior art, even when the capacitor element is made smaller, the size of the casing cannot be reduced to compatible dimensions thus resulting in a large product having an unnecessary void left therein. According to the present invention, smaller package for the capacitor can be manufactured by sealing the flexible casing under reduced pressure thereby reducing the void in the casing so as to match the casing to the size of the capacitor element. While the degree of reducing the pressure is determined by taking the vapor pressure of the electrolytic solution into consideration, the pressure is set in a range from 3 to 720 mmHg, preferably from 3 to 200 mmHg, more preferably from 3 to 50 mmHg, and most preferably from 3 to 20 mmHg.

Outer Casing

The capacitor encased in the sealed flexible casing may also be packaged in an outer casing that has higher strength. Packaging in the outer casing may be done by putting the capacitor encased in the flexible casing into the outer casing that has been formed in a predetermined shape such as a case or a bag and sealing the opening, or by placing the capacitor encased in the flexible casing into a mold and enclosing the flexible casing and the capacitor encased therein with a molten resin by means of transfer molding or injection molding process. When the latter process is employed, conditions such as molding pressure and temperature must be set so that characteristics of the capacitor will not be affected.

The outer casing may be made of a metal or resin sheet. The metallic material may be aluminum or an aluminum alloy, but other metals may also be used. For the resin, for example, nylon, polyethylene terephthalate (PET), epoxy resin, liquid crystal polymer, polybutylene terephthalate (PBT), polyphenylene sulfide (PPS), engineering plastics, polystyrene, polyethylene and fluorocarbon resin may be used. Such a resin may also be used in combination with glass filler added thereto to improve heat resistance and impact resistance. The resin material is not limited to these materials, and other kinds of resin may also be used.

The outer casing may be formed in the predetermined shape, such as cylindrical or bottomed configuration by any appropriate process. For example, the outer casing made of a resin may be manufactured by butting two members having C-shaped cross section made from resin sheets and bonding the joints at two sides. In this case, the members may also be lined with a thermoplastic resin for easier processing. The thermoplastic resin that can be used includes polyester-based resin, polyamide-based resin and acid-modified polyolefin-based resin.

Sealant

The outer casing formed in the predetermined shape may have at least one of the openings stopped with a sealant. The sealant preferably allows easy sealing and has a high degree of freedom in forming the shape thereof. The sealant is formed from such materials as rubber, composite rubber or resin for the reason of elasticity required for sealing and the possibility to form in a desired shape. Rubber materials preferably used are resin-vulcanized butyl rubber, peroxide-vulcanized butyl rubber, ethylene-propylene rubber (EPT), and the like. A representative sealant of composite rubber is made by lining one of the above-mentioned rubber materials with such a material as polytetrafluoroethylene (PTFE), bake material, glass fiber sheet or polypropylene. A thermosetting resin or a thermoplastic resin may also be used for the resin material and, for example, polyethylene terephthalate (PET), polybutylene terephthalate (PBT), nylon, polyphenylene sulfide (PPS), liquid crystal polymer or engineering plastics may be used. PET, PBT, nylon or PPS may also be used in combination with glass filler or the like added thereto so as to improve the heat resistance.

The rubber sealant allows gas to be discharged by diffusion through the rubber, but is not able to discharge hydrogen gas that is rapidly generated during the aging treatment. The present invention provides an arrangement for discharging hydrogen gas that is rapidly generated during the aging treatment, before completing the flat aluminum electrolytic capacitor as described previously. As a result, the rubber sealant provided in this constitution effectively functions to discharge hydrogen gas generated gradually during use of the flat aluminum electrolytic capacitor. Consequently, gas generated during normal use of the capacitor does not increase the gas pressure, resulting in many advantages such as the capacitor does not deform and performance does not deteriorate.

Sealing of the opening at one end of the outer casing with the sealant can be done by inserting the sealant formed in the predetermined shape into the opening and bonding the sealant to the casing. Bonding of the sealant with the outer casing can be done by, for example, bonding with an adhesive, thermal sealing, ultrasonic welding, hermetic seal, laser welding or pressure welding. The sealant may be smaller than the opening of the outer casing, but must be in close contact with at least a part of the outer casing.

In order to prevent the flexible casing from coming off the outer casing, the flexible casing may be secured onto the outer casing, so as to keep the flexible casing from coming off the outer casing due to vibration or impact, by means of an adhesive, thermal sealing, ultrasonic welding, hermetic seal, laser welding or pressure welding.

The element of the flat aluminum electrolytic capacitor is manufactured in a stacked or wound structure. Specifically, the capacitor element of stacked structure is manufactured by stacking an anode foil, that is made by etching a high purity aluminum foil so as to increase the surface area and processed to form a dielectric layer on the surface thereof through anodic oxidation, and an aluminum cathode foil that is etched on the surface thereof and is disposed to oppose the anode foil, with a separator paper impregnated with the electrolytic solution being interposed between the anode foil and the cathode foil. The laminate having such a structure is wound in a cylindrical shape and pressed, or the stack is wound in a flattened shape thereby to make the capacitor element of wound structure. The capacitor element of stacked structure may be constituted to have a plurality of the stacks described above.

Such capacitor elements are well known and need not be described in detail here.

The flat aluminum electrolytic capacitor is provided with external terminals for connecting the anode foil and the cathode foil to an external circuit. The external terminals are preferably formed in the form of film or foil strip, so as to make it easier to mount the board-like terminals connected thereto, make it easier to seal the portion where the terminals are led out of the flexible casing, and make it possible to absorb the movement of the capacitor element encased in the flexible casing. The external terminals are mounted on the aluminum foil, and therefore preferably made of aluminum or aluminum alloy.

The external lead-out terminals are provided with lead terminals so as to decrease the inner resistance of the capacitor and allow easy soldering when mounting the capacitor on a circuit board. The lead terminal may be made of a material that can be soldered, preferably a metallic material including at least one metal selected from among iron, copper, tin, lead, silver, gold, zinc, bismuth, tungsten, nickel, titanium and chromium. The lead terminal may have any shape such as strip or sheet that allows mounting of the capacitor on a circuit board, while a join with the external lead-out terminal made of aluminum or aluminum alloy in the form of film or foil strip is preferably formed in a flat shape so as to facilitate fusing of the contact area of the lead terminal with the external lead-out terminal.

Either one lead terminal or a plurality of lead terminals may be provided for each external lead-out terminal. Connecting a plurality of lead terminals has an advantage of decreasing the resistance of the join and improving the characteristics and reliability during use with a large current flowing therethrough.

The lead terminal may also be integrated with the sealant of the outer casing. Integrating the lead terminal with the sealant has an advantage of making the lead terminal less susceptible to stress exerted from the outside. This constitution enables it to avoid damage or breakage of the joints between the external lead-out terminals and fused joints between the lead terminals and the flexible casing.

Examples of the flat aluminum electrolytic capacitor of the present invention will be described below, but it should be noted that the present invention is not limited to these Examples.

As shown in FIG. 1, a flat aluminum electrolytic capacitor element (12) having voltage rating of 330 V and capacitance of 120 $\mu$F (anode foil is rated at 330 WV) impregnated with an electrolytic solution was put into a flexible casing (14) and opening of a bag having external lead-out terminals (16) made of aluminum in the form of strip being drawn to the outside was hermetically sealed, thereby making a capacitor (10).

Figure 2:
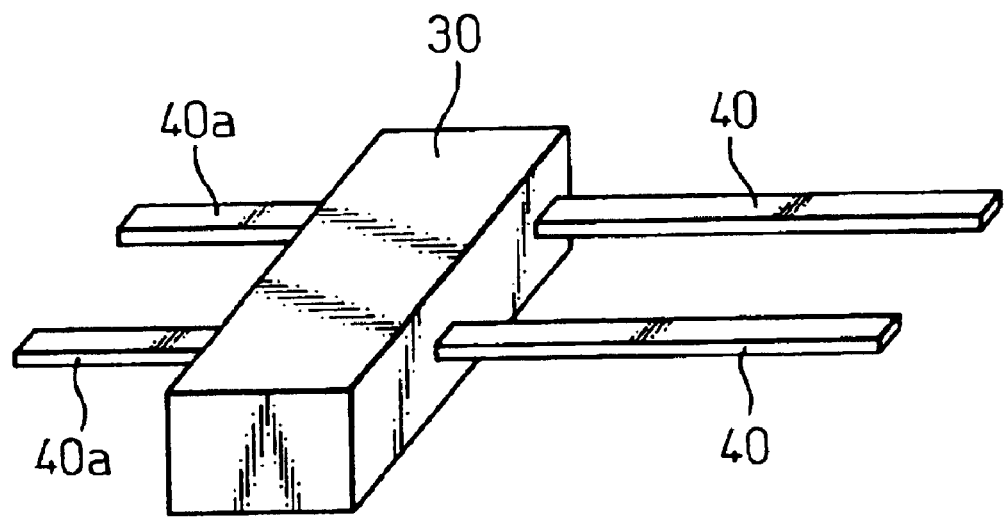
FIG. 2 is a perspective view showing a sealant integrated with a lead terminal used in the Examples.
Figure 3:
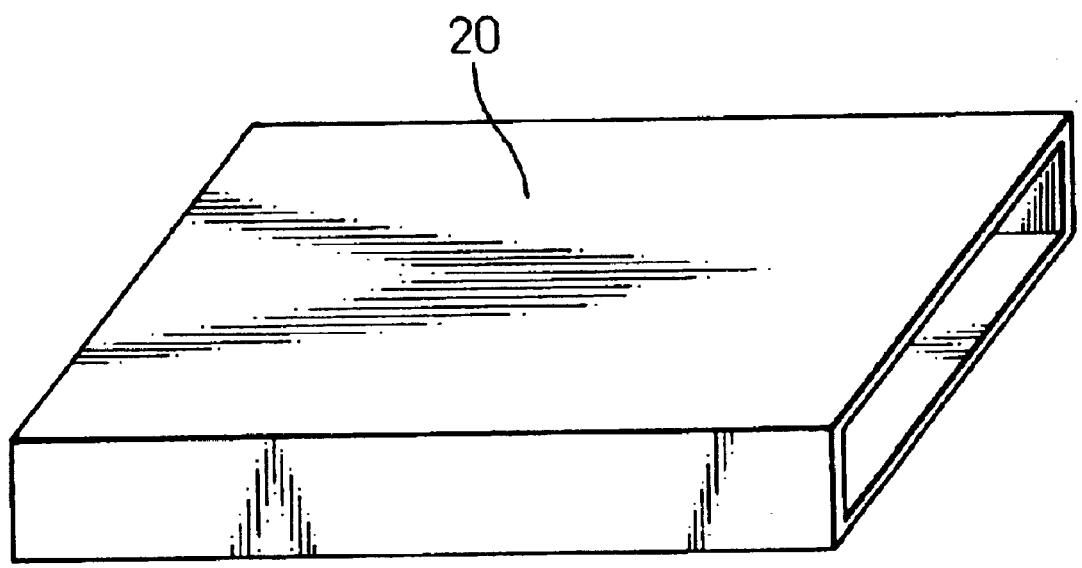
FIG. 3 is a perspective view showing a flexible casing used in the Examples.
Figure 4:
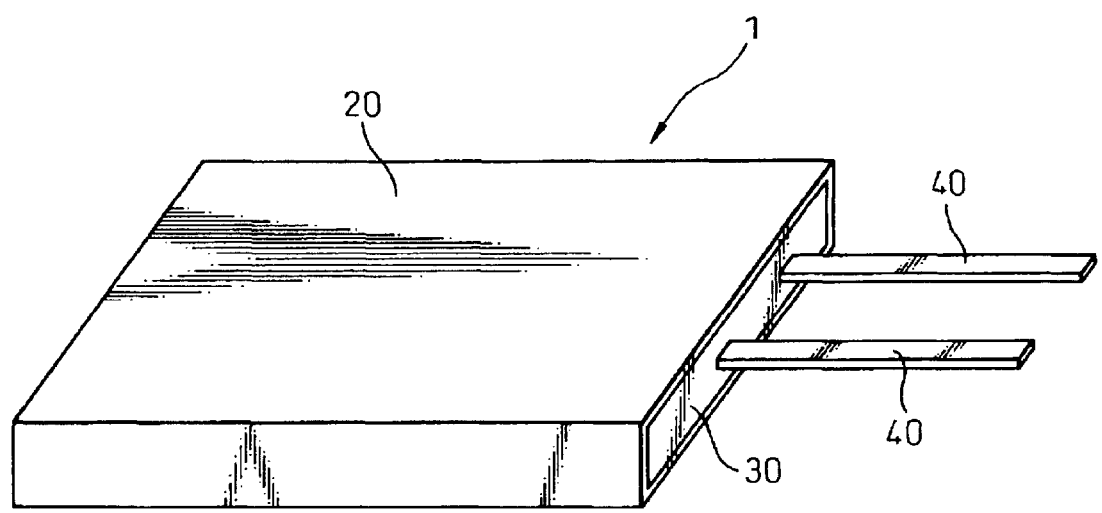
FIG. 4 is a perspective view showing an aluminum electrolytic capacitor manufactured in the Examples.

Then one end (40a) of a lead terminal (40) that is integrated with a sealant (30) shown in FIG. 2 was bonded with the external lead-out terminal (16) of the capacitor (10) by laser welding. The capacitor (10) having the lead terminals (40) connected thereto was inserted into an outer casing (20) made of polyethylene terephthalate in a shape of rectangular cross section with low profile shown in FIG. 3, and the opening of the outer casing (20) was stopped with the sealant (30) and sealed by thermal sealing, thereby making the flat aluminum electrolytic capacitor having the outer casing as shown in FIG. 4.

In Comparative Examples 1 and 2, and Examples 2 and 6, an ethylene glycol-based electrolytic solution containing ammonium azelate was used as a main solute. In Examples 1, 3, 4 and 5, the ethylene glycol-based electrolytic solution containing ammonium azelate used in Comparative Examples 1 and 2, and Examples 2 and 6 containing 1% of nitro phenol added thereto was used.

EXAMPLE 1

The capacitor element impregnated with the electrolytic solution was encased in a flexible casing made of PET, aluminum and acid-denatured PP and, after being subjected to an aging treatment with 330 V applied at ambient temperature of 75° C. for one hour, the flexible casing was hermetically sealed thereby to make a capacitor element. Then the flat aluminum electrolytic capacitor having the outer casing was made by the method described above.

EXAMPLE 2

The capacitor element being impregnated with the electrolytic solution was subjected to an aging treatment with 330 V applied at ambient temperature of 20° C. for one hour, and was encased in a flexible casing made of PP that was then hermetically sealed thereby to make a capacitor element. Then the flat aluminum electrolytic capacitor having the outer casing was made by the method described above.

EXAMPLE 3

The capacitor element impregnated with the electrolytic solution was, after applying voltage of up to 350 V at ambient temperature of 20° C., subjected to an aging treatment with 330 V applied at ambient temperature of 85° C. for one hour followed by another aging treatment with 350 V applied at ambient temperature of 20° C., with the capacitor element being encased in the flexible casing made of PP that was hermetically sealed under reduced pressure of 100 mmHg thereby to make a capacitor element. Then the flat aluminum electrolytic capacitor having the outer casing was made by the method described above.

EXAMPLE 4

The capacitor element impregnated with the electrolytic solution was, after being subjected to an aging treatment with the voltage increased stepwise by 10 V up to 330 V applied at ambient temperature of 85° C., encased in a flexible casing made of PET, aluminum and acid-denatured PP, with the flexible casing being hermetically sealed thereby to make a capacitor element. Then the flat aluminum electrolytic capacitor having the outer casing was made by the method described above.

EXAMPLE 5

The capacitor element impregnated with the electrolytic solution was encased in a flexible casing made of PET, aluminum and acid-denatured PP with the flexible casing being sealed and, after applying voltage of up to 350 V at ambient temperature of 25° C., subjected to another aging treatment with 330 V applied at ambient temperature of 90° C. for one hour, then the flexible casing was unsealed to draw out gas that accumulated inside under reduced pressure and the flexible casing was hermetically sealed again under reduced pressure of 3 mmHg to make a capacitor element. Without providing an outer casing, the flexible casing was provided with lead terminals that are laser-welded to the ends of the external lead-out terminals thereof, thereby completing the flat aluminum electrolytic capacitor.

EXAMPLE 6

The flat aluminum electrolytic capacitor element was impregnated with the electrolytic solution, then encased in a flexible casing made of PET, aluminum and acid-denatured PP and was subjected to an aging treatment with 330 V applied at ambient temperature of 85° C. for one hour. After the aging treatment, the flexible casing was unsealed so as to disperse the gas accumulated therein. Then the capacitor element was again impregnated with a similar electrolytic solution and was encased in the flexible casing that was then hermetically sealed thereby to make a capacitor element. Then the flat aluminum electrolytic capacitor having the outer casing was made by the method described above.

COMPARATIVE EXAMPLE 1

The capacitor element impregnated with the electrolytic solution was encased in a flexible casing made of PP and was subjected to an aging treatment with 330 V applied at ambient temperature of 30° C., thereby to make a capacitor element. Then the flat aluminum electrolytic capacitor having the outer casing was made by the method described above.

COMPARATIVE EXAMPLE 2

The capacitor element impregnated with the electrolytic solution was encased in a flexible casing made of PET, aluminum and acid-denatured PP and was subjected to an aging treatment with 330 V applied at ambient temperature of 85° C. thereby to make a capacitor element. Then the flat aluminum electrolytic capacitor having the outer casing was made by the method described above.

The flat aluminum electrolytic capacitors made as described above having voltage rating of 330 V and capacitance of 120 μF showed characteristics, after the aging treatment, and appearance as shown in Table 1. Capacitance and the value of Tanδ were measured at ambient temperature of 25° C. and frequency of 120 Hz. Leak current was measured by applying a voltage of 330 V for one minute.

Impregnation with the electrolytic solution can be carried out by vacuum impregnation (impregnation at reduced pressure), dipping impregnation at normal pressure or a process combining the vacuum impregnation and the normal pressure impregnation, and similar effects have been verified with any of these processes.

TABLE 1

| | Characteristics and appearance after aging | | | |
|---|---|---|---|---|
| | Capacitance ($\mu$F) | Tan $\delta$ (%) | Leak current ($\mu$A) | Appearance |
| Comparative Example 1 | 120.1 | 8.2 | 160 | case was swollen |
| Comparative Example 2 | 120.3 | 11.3 | 185 | case was swollen |
| Example 1 | 120.4 | 4.0 | 56 | not swollen |
| Example 2 | 120.8 | 4.1 | 62 | not swollen |
| Example 3 | 120.1 | 4.2 | 82 | not swollen |
| Example 4 | 120.4 | 4.0 | 63 | not swollen |
| Example 5 | 120.7 | 4.1 | 53 | not swollen |
| Example 6 | 120.3 | 4.2 | 56 | not swollen |

As can be seen from the results shown in Table 1, Comparative Examples 1 and 2 showed swelling of the casing due to the aging treatment and unfavorable characteristics with the value of Tan$\delta$ and leak current larger than those of the Examples of the present invention. In contrast, no problems such as swelling of the casing during the aging treatment and leaking liquid were observed in the Examples of the present invention. The Examples of the present invention also showed initial value of Tan$\delta$ and leak current that were lower than those of Comparative Examples, and capacitors of better characteristics with lower loss were obtained than Comparative Examples.

TABLE 2

| | After charge and discharge test (10000 times) | | | |
|---|---|---|---|---|
| | Capacitance ($\mu$F) | Tan $\delta$ (%) | Leak current ($\mu$A) | Appearance (mm) |
| Example 1 | 120.5 | 4.1 | 66 | 0.02 |
| Example 2 | 120.7 | 4.1 | 70 | 0.5 |
| Example 3 | 120.1 | 4.4 | 85 | 0.02 |
| Example 4 | 120.5 | 4.3 | 67 | 0.02 |
| Example 5 | 120.5 | 4.2 | 63 | 0.01 |
| Example 6 | 120.1 | 4.4 | 68 | 0.6 |

The flat aluminum electrolytic capacitors made by the methods of the Examples of the present invention 1 to 6 having voltage rating of 330 V and capacitance of 120 $\mu$F were subjected to charge and discharge test at ambient temperature of 25° C. The charge and discharge test was conducted with charging voltage of 330 V, charging current of 5 mA, with intervals of 10 seconds between charge and discharge. The thickness of the products was measured with a variable force digital micrometer (manufactured by Mitsutoyo Corp., code No.227-201), after the aging treatment and after the charge and discharge test, to determine the difference. As can be seen from the result shown in Table 2, satisfactory capacitors with no significant change in thickness of the product after the charge and discharge test and no significant swelling were obtained in Examples 1, 3, 4 and 5 wherein a nitro compound was added to the electrolytic solution.

Effect of the Invention

According to the invention, problems such as swelling of the flexible casing during the aging treatment and leakage of the electrolytic solution can be prevented by improving the method of the aging treatment for the flat aluminum electrolytic capacitor. Moreover, the flat aluminum electrolytic capacitor can be advantageously made smaller in profile and thickness by sealing the casing under reduced pressure with such external configuration that the degree of freedom in the shape can be made higher, thus making a great contribution to the expansion of apparatuses to which electrolytic capacitors can be applied. Also because hydrogen gas generated during use can be absorbed, the capacitor can maintain the initial shape without swelling.

With the constitution described above, as hydrogen gas generated during the aging treatment can be dispersed to the outside and the amount of hydrogen gas generated can be suppressed, swelling of the flexible casing and leakage of the electrolytic solution can be suppressed. An effect of preventing the resistance, between the electrodes, from increasing due to hydrogen gas generated is also provided.

What is claimed is:

1. A flat aluminum electrolytic capacitor comprising a separator impregnated with an electrolytic solution, an anode foil and a cathode foil, a flat capacitor element that has external lead-out terminals connected respectively to the anode foil and the anode foil, and a flexible casing that houses the capacitor element and is hermetically sealed to define an inside of said flexible casing, the inside of the flexible casing being under reduced pressure compared to ambient pressure outside of the flexible casing.

2. The flat aluminum electrolytic capacitor in accordance with claim 1 wherein the reduced pressure is in the range of 3 to 720 mmHg.

3. The flat aluminum electrolytic capacitor in accordance with claim 1 wherein the reduced pressure is in the range of 3 to 50 mmHg.

4. The flat aluminum electrolytic capacitor in accordance with claim 1 wherein the reduced pressure is in the range of 3 to 20 mmHg.

5. A flat aluminum electrolytic capacitor having a separator impregnated with an electrolytic solution, an anode foil and a cathode foil, a flat capacitor element that has external lead-out terminals connected respectively to the anode foil and the cathode foil, and a flexible casing that houses the capacitor element and is hermetically sealed to define an inside of said flexible casing, the inside of the flexible casing being under reduced pressure compared to ambient pressure outside of the flexible casing, said capacitor being made using a process comprising a step wherein the flat capacitor element is subjected to an aging treatment after being sealed in said flexible casing.

6. The flat aluminum electrolytic capacitor in accordance with claim 5 wherein the capacitor element is a laminate element formed by laminating the cathode foil and anode foil of a predetermined size alternatively via a separator or winding a laminate of long anode and cathode foils one on another via a separator with resultant roll being flattened, the reduced pressure in the inside of the flexible casing being less than one atmospheric pressure.

7. The flat aluminum electrolytic capacitor in accordance with claim 5 further comprising an outer casing having a higher strength than the flexible casing to encase the flexible casing.

8. The flat aluminum electrolytic capacitor in accordance with claim 7 wherein the electrolytic solution contains at least one kind of nitro compound.

9. The flat aluminum electrolytic capacitor in accordance with claim 7 wherein the outer casing has at least one of a plurality of openings stopped with a sealant.

10. The flat aluminum electrolytic capacitor in accordance with claim 9 wherein the sealant is made of a sealing material selected from rubber, composite rubber and resin.

11. The flat aluminum electrolytic capacitor in accordance with claim 9 wherein the external lead-out terminals are in the form of film or foil.

12. The flat aluminum electrolytic capacitor in accordance with claim 11 wherein at least one lead terminal is provided for each external lead-out terminal.

13. The flat aluminum electrolytic capacitor in accordance with claim 12 wherein the lead terminal is integrated with the sealant.

14. The flat aluminum electrolytic capacitor in accordance with claim 13 wherein the flexible casing is made of metal, resin or composite thereof.

15. The flat aluminum electrolytic capacitor in accordance with claim 13 wherein the flexible casing is made of metal, resin or composite thereof.

16. The flat aluminum electrolytic capacitor in accordance with claim 7 wherein the outer casing has at least one of a plurality of openings stopped with a rubber sealant, the external lead-out terminals are in the form of film or foil, at least one lead terminal is provided for each external lead-out terminal, the lead terminal is integrated with the sealant, the flexible casing is made of metal, resin or composite thereof and the outer casing is made of metal or resin.

* * * * *